United States Patent
Nichols et al.

(10) Patent No.: US 8,201,480 B2
(45) Date of Patent: Jun. 19, 2012

(54) BARREL DRIVE MECHANISM FOR PALLETS

(76) Inventors: Noel D. Nichols, Pecatonica, IL (US); Robert R. Hornby, Janesville, WI (US)

( * ) Notice: Subject to any disclaimer, the term of this patent is extended or adjusted under 35 U.S.C. 154(b) by 966 days.

(21) Appl. No.: 12/199,162

(22) Filed: Aug. 27, 2008

(65) Prior Publication Data

US 2010/0051415 A1 Mar. 4, 2010

(51) Int. Cl.
*B23Q 16/02* (2006.01)
*F16H 29/20* (2006.01)
(52) U.S. Cl. ..................... 74/813 R; 74/89.38
(58) Field of Classification Search ............... 198/468.9; 74/16, 89.38, 424.93, 813 R, 816, 819, 821, 74/825, 826
See application file for complete search history.

(56) References Cited

U.S. PATENT DOCUMENTS

| | | | |
|---|---|---|---|
| 1,496,463 A | 6/1924 | Iverson | |
| RE16,177 E | 9/1925 | Iverson | |
| 1,631,236 A | 6/1927 | Werner | |
| 1,874,505 A | 8/1932 | Gregoire | |
| 2,468,182 A | 4/1949 | Dempsey | |
| 2,561,346 A * | 7/1951 | De Vlieg et al. | 408/69 |
| 2,630,341 A | 3/1953 | Downey | |
| 2,857,787 A | 10/1958 | Natalis | |
| 4,452,103 A * | 6/1984 | Lijewski et al. | 74/817 |
| 5,009,296 A | 4/1991 | Ohkawa et al. | |
| 5,033,608 A | 7/1991 | Lorimor et al. | |
| 5,188,210 A | 2/1993 | Malow | |
| 6,843,358 B1 | 1/2005 | Rhodes | |
| 2004/0144191 A1 * | 7/2004 | Kato | 74/425 |

* cited by examiner

*Primary Examiner* — Thomas R Hannon
*Assistant Examiner* — Phillip A Johnson
(74) *Attorney, Agent, or Firm* — Reising Ethington P.C.

(57) ABSTRACT

A rotary drive mechanism is used to insert a pallet into the workzone of a machine tool past the plane the guard doors. Cam barrels are mounted one each on the opposite ends of a pair of opposed drive shafts that are driven by a pair of drive hubs. The cam barrels engage cam followers mounted on the underside of the pallet to drive the pallet into the workzone of the machine tool. The connection between the drive shafts and the drive hubs is separable, allowing the drive shafts to be uncoupled from the drive hubs when desired. The drive hubs are mounted on a hub carrier that is rotatable about a vertical axis to uncouple the drive hubs from the drive shafts and swing the drive hubs out of the plane of the guard doors, allowing the doors to close.

17 Claims, 5 Drawing Sheets

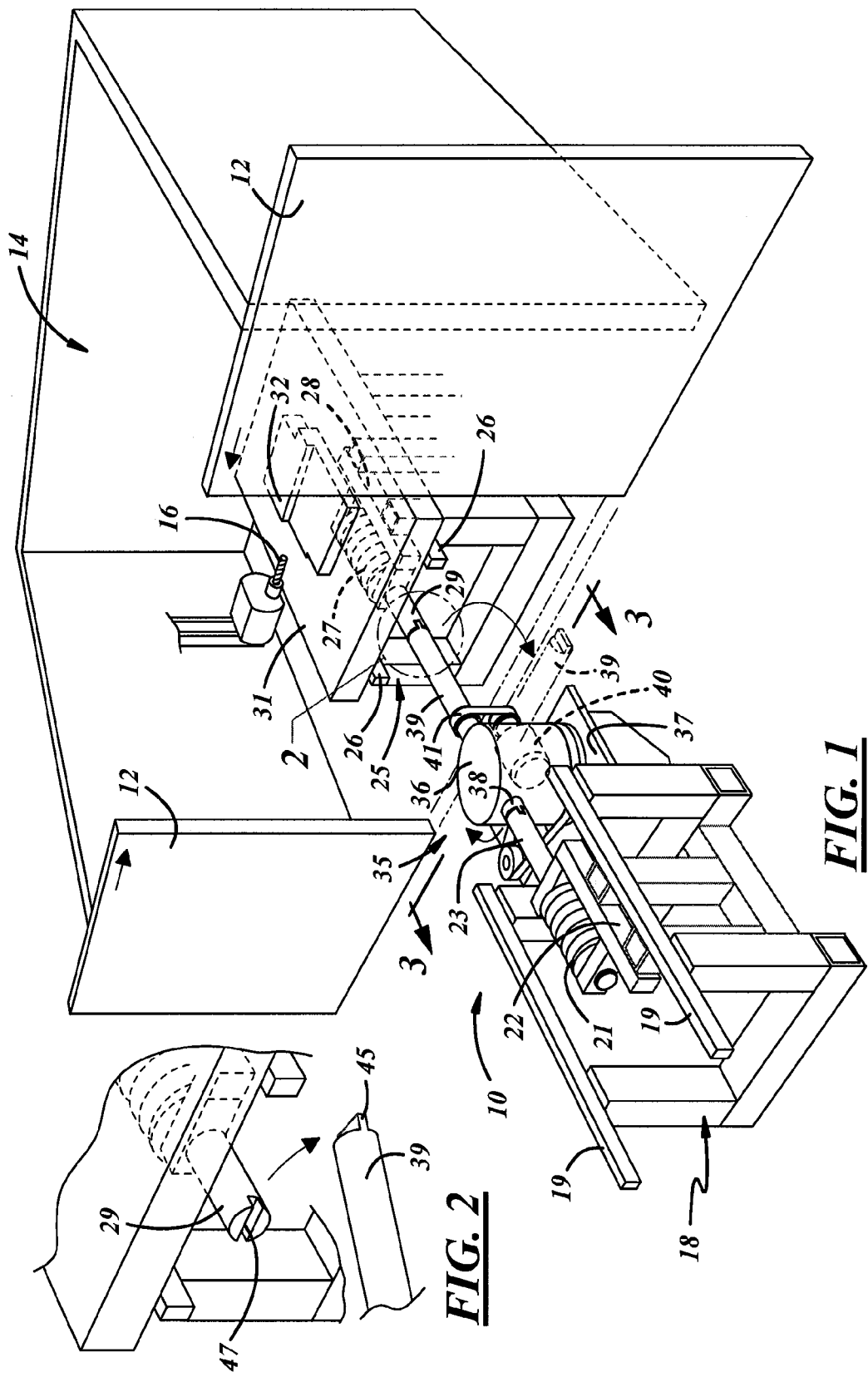

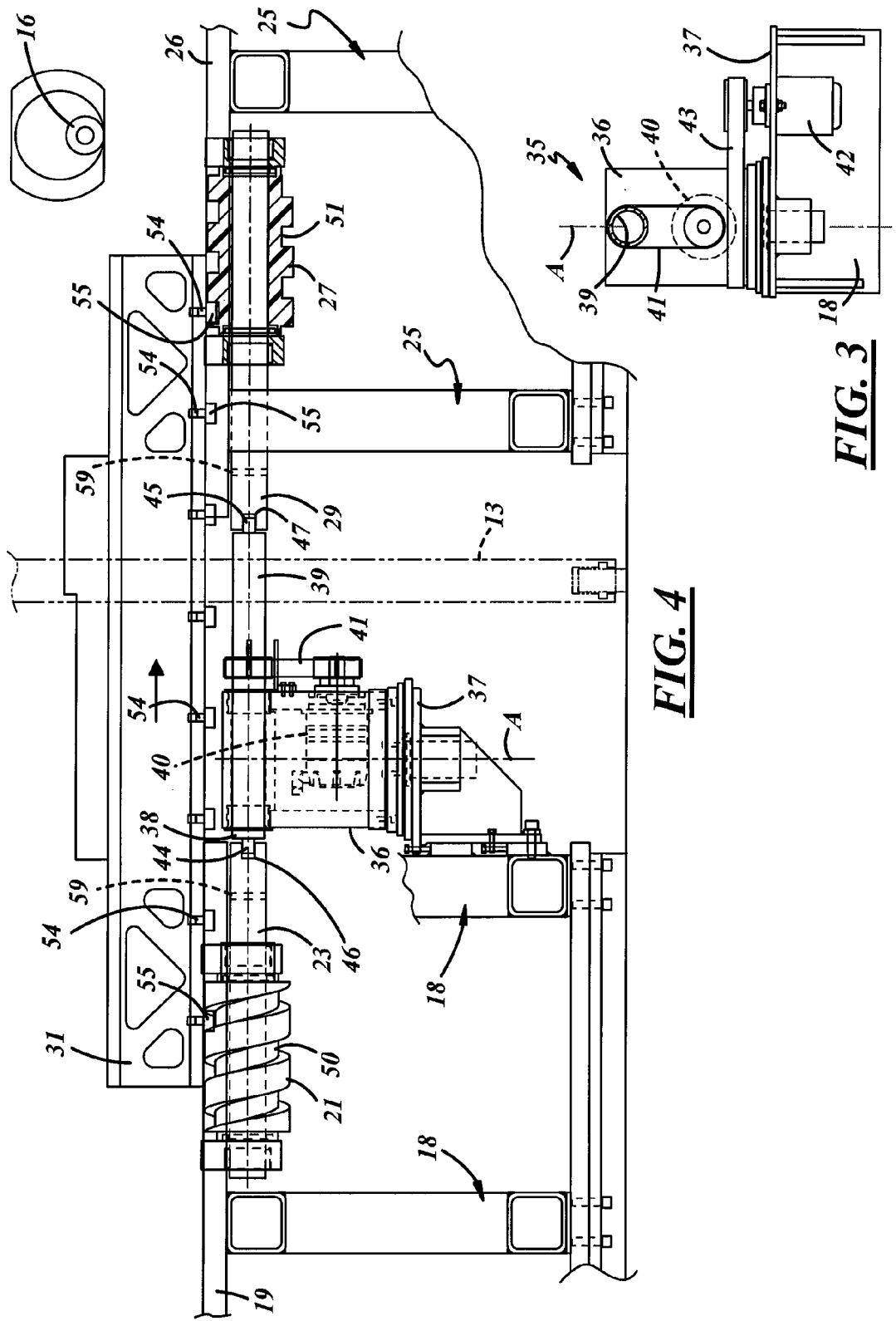

BARREL DRIVE MECHANISM FOR PALLETS

FIELD OF THE INVENTION

The invention relates to a drive mechanism for inserting and withdrawing a pallet from the workzone of a machine tool.

BACKGROUND OF THE INVENTION

A mechanism is required to insert and withdraw a horizontal or vertically mounted pallet with a workpiece into the workzone of a machine tool. Modem machine tools are provided with guard doors to contain coolant and debris formed by the machining operation within the workzone. The guard doors need to be open in order to insert a workpiece into the workzone, and interlocks are provided that prevent the machine from operating before the guard doors are closed. As a result, any mechanism that is used to convey the pallet into the workzone has to be withdrawn from the workzone before the guard doors can close and the machine can operate.

OBJECTS AND SUMMARY OF THE INVENTION

It accordingly an object of the invention to provide a mechanism for inserting and withdrawing a pallet from the workzone of machine tool.

It is another object of the invention to provide a mechanism for inserting and withdrawing a pallet from the workzone of machine tool in which the mechanism can be easily withdrawn from the workzone of the machine tool to allow the guard doors of the machine tool to close.

It is another object of the invention to provide a mechanism for inserting and withdrawing a horizontal or vertically mounted pallet from the workzone of machine tool in which the mechanism is movably mounted on a support so that it can be moved out of the plane of the guard doors of the machine tool.

These and other objects of the invention are provided by the invention described below and taken in conjunction with the accompanying drawing figures.

SUMMARY OF THE INVENTION

A rotary drive mechanism is used to insert a pallet into the workzone of a machine tool past the plane the guard doors. The drive mechanism comprises a pair of cam barrels that are mounted on the opposite ends of a pair of opposed drive shafts. The drive shafts are driven by a pair of drive hubs. The connection between the drive shafts and the drive hubs is separable, allowing the drive shafts to be uncoupled from the drive hubs when desired. The cam barrels engage cam followers mounted on the underside of the pallet to drive the pallet into the workzone of the machine tool. The drive hubs are mounted on a hub carrier that is rotatable about a vertical axis. Once the pallet has been driven past the plane of the guard doors into the workzone, the upper portion of the hub carrier is rotated to uncouple the drive hubs from the drive shafts and swing the drive hubs out of the plane of the guard doors, allowing the doors to close.

BRIEF DESCRIPTION OF THE DRAWING FIGURES

FIG. 1 is a perspective view of a portion of a horizontal machine tool and a pallet drive mechanism for inserting and withdrawing pallets from the workzone of the machine tool.

FIG. 2 is a detail view showing a tongue and groove mechanism used to couple the drive hubs to the drive shafts of the pallet drive mechanism.

FIG. 3 is a detail view showing the hub carrier that is used in the mechanism of FIG. 1.

FIG. 4 is a side view of the mechanism of FIG. 1.

DESCRIPTION OF THE PREFERRED EMBODIMENT

Figure 8:
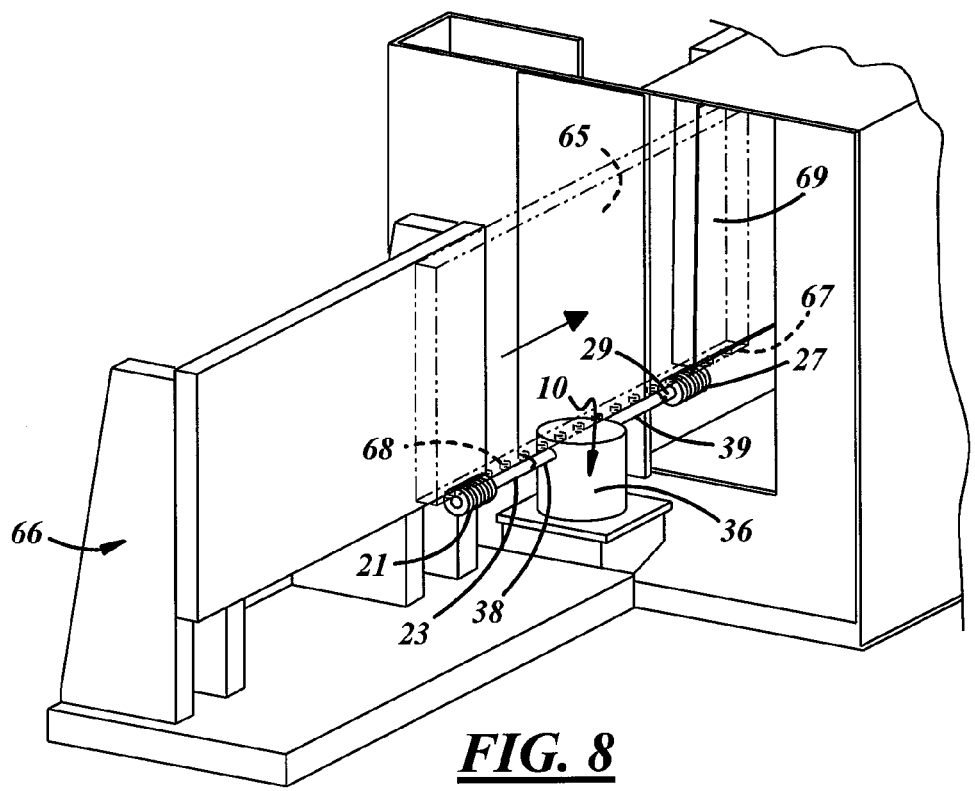
FIG. 8 is a perspective view of a pallet drive mechanism used with a pallet in the vertical position.

FIG. 1 shows a barrel drive mechanism for pallets generally designated by the reference numeral 10. The drive mechanism 10 is positioned outside of the guard doors 12 of a machine tool enclosure 14. The guard doors 12 define a guard door plane 13 (best seen in FIGS. 4 and 5) that open and close to control access to the workzone containing one or more working tools 16. A first pallet support stand 18 having two pallet support rails 19 is positioned outside of the guard doors 12 on a first side of the guard door plane 13. A first cam barrel 21 is positioned between the two pallet support rails 19 and is rotatably mounted in a cam barrel bracket 22 that is attached to the first support stand 18. The first cam barrel 21 has an axially extending first drive shaft 23. The pallet 31 is shown in the horizontal position. A pallet may also be oriented in the vertical position as shown in FIG. 8 described below.

A second horizontal pallet support stand 25 having two pallet support rails 26 is positioned inside of the guard doors 12 on a second side of the guard door plane 13. The second pallet support stand 25 is positioned in front of the working tool 16 of a machine tool (not shown). A second cam barrel 27 is positioned between the two pallet support rails 26 and is rotatably mounted in a cam barrel bracket 28 that is attached to the second support stand 25. The second cam barrel 27 has an axially extending second drive shaft 29. A pallet 31 with a workpiece 32 is shown positioned on the two pallet support rails 26 of the second support stand 25 in front of the working tool 16.

The first and second drive shafts 23 and 29 may be rotated by a hub drive mechanism 35 best seen in FIGS. 3 and 4. The hub drive mechanism 35 comprises a hub carrier 36 that is mounted on a platform 37 that may be attached to the first support stand 18. The hub carrier 36 has opposed first and second drive hubs 38 and 39 that mate with the first and second drive shafts 23 and 29, respectively. The drive hubs 38 and 39 are on opposite ends of a common shaft 34 that passes through the hub carrier 36 and are driven by a first drive unit or hub drive motor 40 through a drive belt 41. The hub carrier 36 may be rotated about a vertical axis A relative to the platform 37 by a second drive unit or positioning motor 42. The positioning motor 42 is fixed to the platform 37 and may be coupled to the hub carrier 36 by a drive transmitting device such as a belt 43. The hub carrier 36 may be rotated through an angle sufficient to rotate the second drive hub 39 to the position shown in phantom in FIG. 1. In the embodiment shown, this angle is approximately ninety degrees.

The rotation of the hub carrier 36 and the drive hubs 38 and 39 defines a pivoting plane that is orthogonal to the vertical axis A. Rotation of the positioning motor 42 is controlled by a controller.

FIG. 4 is a side view of the mechanism of FIG. 1 but showing the pallet 31 spanning the two support stands 18 and 25. The end of each drive hub 38 and 39 terminates in a drive tongue 44 and 45, respectively, and each drive tongue engages a groove 46 and 47 in the facing end of the first and second drive shafts 23 and 29, respectively. The tongue and groove connection between the drive hubs 38 and 39 and the respective drive shaft 23 and 29 allows the drive hubs to impart rotary motion to the cam barrels 21 and 27, but to be easily uncoupled from the cam barrels using an arcuate displacement of the drive hubs along the pivoting plane.

FIG. 2 is a detail view showing the tongue and groove elements 45 and 47 of the drive hub 39 and the drive shaft 29, respectively. The tongue 45 on the end of the drive hub 39 is shown after it has been displaced along an arcuate path out of engagement with the groove 47 in the drive shaft 29.

Returning to FIG. 4, the cam barrel mechanism 10 can be used to drive a pallet that may have a workpiece mounted thereon. Each cam barrel 21 and 27 is formed with a helical groove 50 and 51. A plurality of cam followers 54 are mounted on the underside of the pallet 31 at regular intervals. A bearing 55 is mounted on the end of each cam follower 54. The spacing between adjacent cam followers 54 is equal to a multiple of the pitch of the cam grooves 50 and 51 that are formed on the cam barrels 21 and 27 so that two or more cam followers 54 may simultaneously engage the cam groove in one of the cam barrels.

Figure 5:
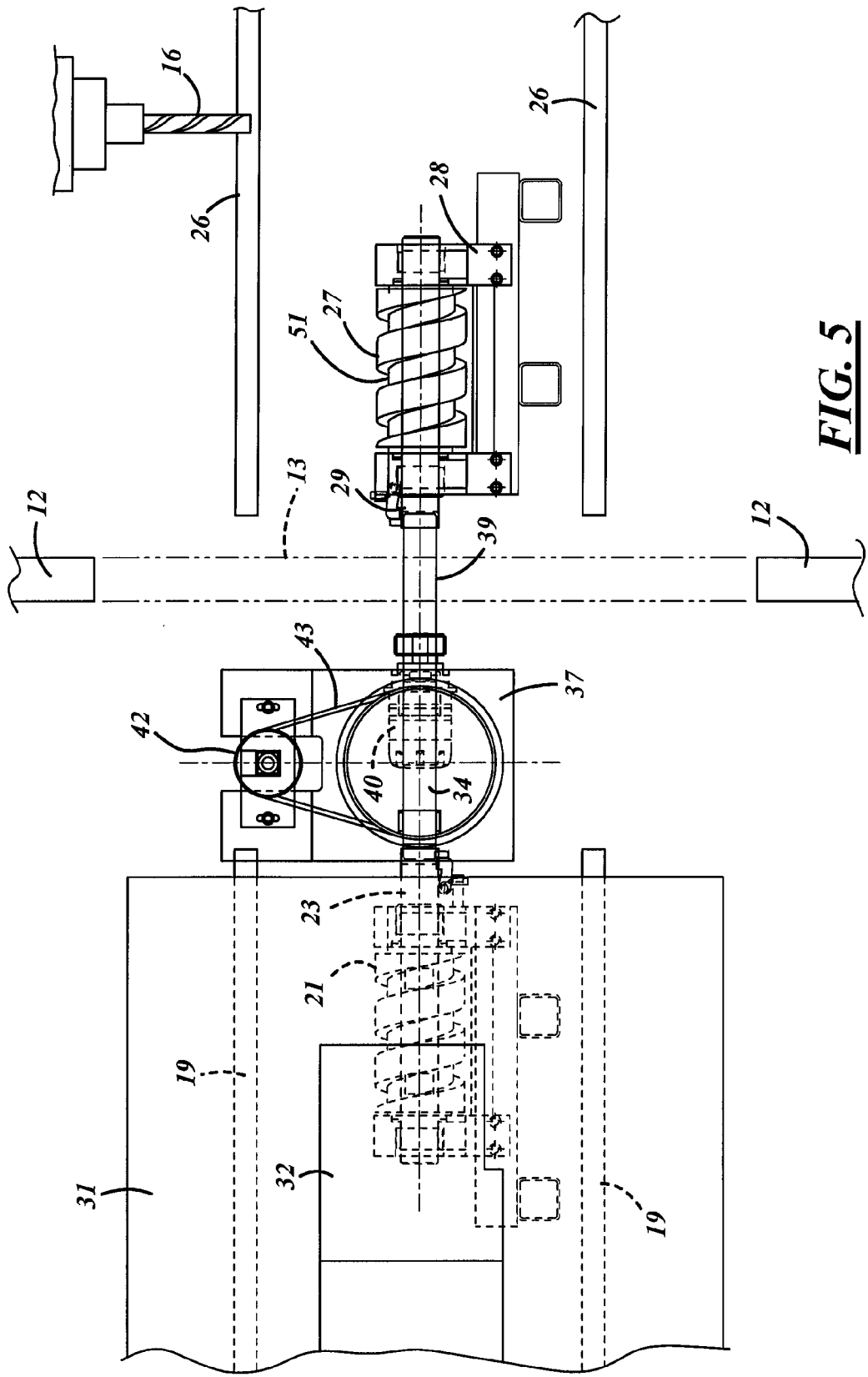
FIG. 5 is a plan view of the mechanism of FIG. 1 showing a pallet outside of the workzone of the machine tool.

FIG. 5 shows a pallet 31 and a workpiece 32 outside of the workzone of a machine tool. The machine tool includes guard doors 12 that open and close along a guard door plane 13. The guard doors 12 are shown in the open position to allow the pallet to be driven from outside of the workzone, through the guard door plane 13, and into the workzone in front of the working tool 16. The rotation of the drive hubs 38 and 39 is synchronized with the position of the pallet 31 so that when the pallet is in the final position in the workzone, the drive tongues 44 and 45 on the ends of the drive hubs 38 and 39 are horizontal, parallel with the pivoting plane of rotation of the drive hubs around the vertical axis A. The horizontal position of the drive tongues 44 and 45 allows the positioning motor 42 to rotate the hub carrier 36 and the drive hubs 38 and 39 from the position shown in FIG. 5 to the position shown in FIG. 6 along the arcuate path C. With the drive hubs rotated to the FIG. 6 position, the second drive hub 39 no longer passes through the guard door plane 13, and the guard doors 12 may be closed, allowing machining to take place in the workzone.

Figure 6:
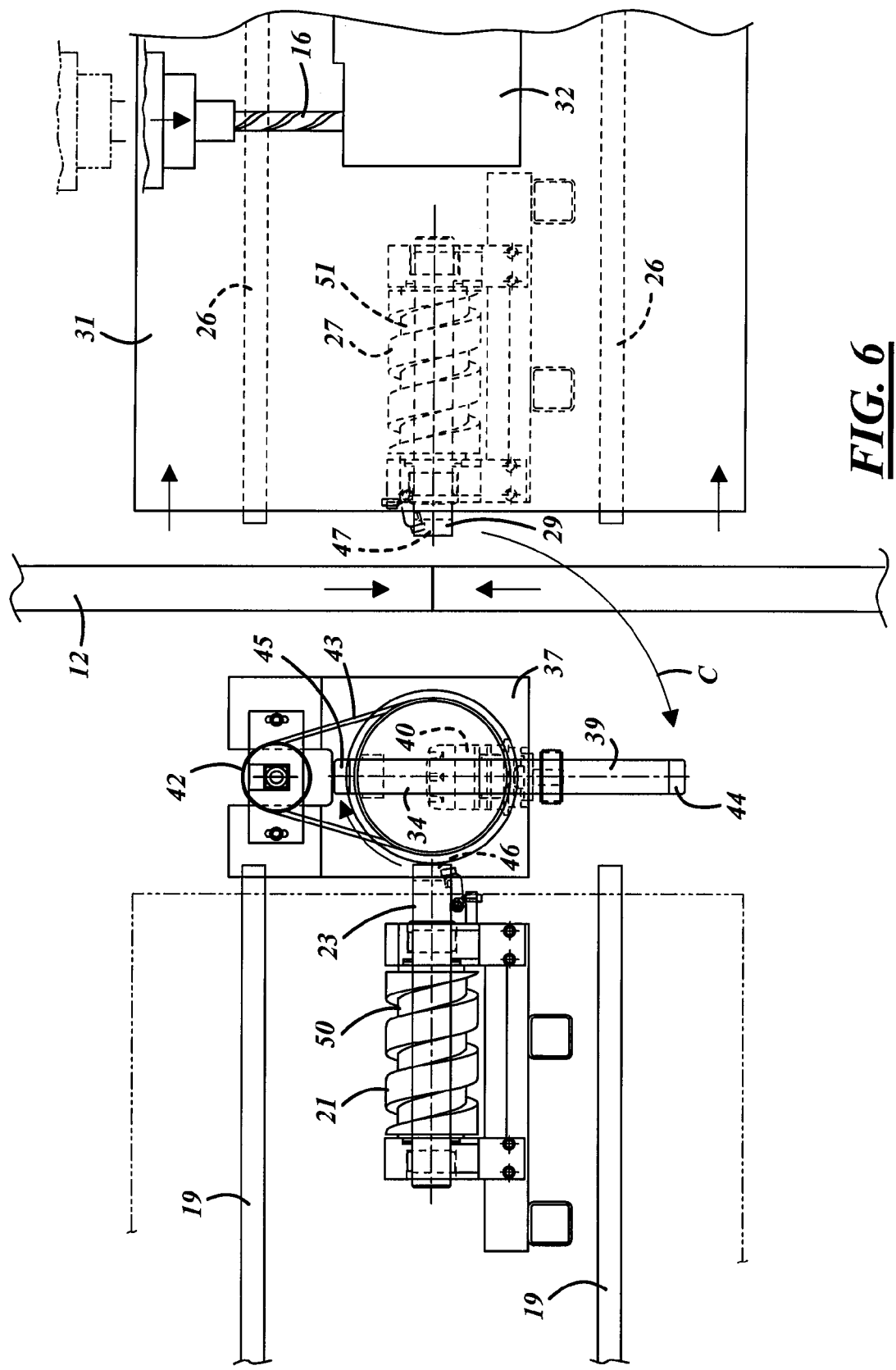
FIG. 6 is a plan view of the mechanism of FIG. 1 showing the pallet inside of the workzone of the machine tool.
Figures 7A, 7B:
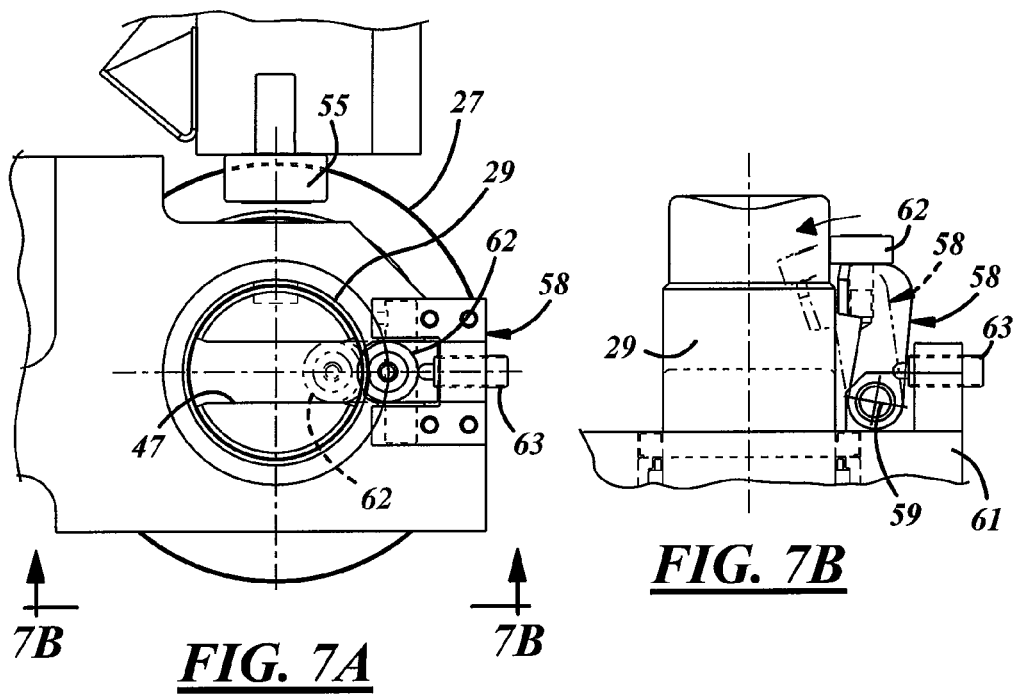
FIG. 7A is a detail view showing a locking latch that engages the end of the drive shaft of the pallet drive mechanism.
FIG. 7B is a plan view of the locking latch of FIG. 7A.

FIGS. 7A and 7B are detail views of the drive shaft locking latch 58 that is mounted on the support stand 25. The locking latch prevents rotation of the drive shaft 29 when the drive hub 39 is rotated out of engagement with the drive shaft 29 as shown in FIG. 6. The locking latch 58 is mounted by a pivot 59 to a support surface 61. A roller cam 62 is mounted on the end of the locking latch, and a spring cylinder 63 biases the cam into contact with the drive shaft 29. The roller cam 62 is dimensioned to fit into the groove 47 in the end of the drive shaft 29. When the tongue of the drive hub 39 is engaged with the groove 47, the tongue displaces the roller cam 62 from the groove, allowing the drive shaft to rotate freely. When the hub carrier 36 rotates the drive hub 39 out of engagement with the drive shaft 29, the spring cylinder 63 forces the roller cam 62 into the groove 47 of the drive shaft, locking the drive shaft against rotation. FIG. 7A shows in phantom the roller cam 62 positioned in the groove 47 of the drive shaft. A similar locking latch 58 is provided on the support stand 18 to lock the drive shaft 23 against rotation when the hub carrier 36 rotates the drive hubs to the position shown in FIG. 6.

After the machining operation on the workpiece has been completed, the guard doors 12 open and the positioning motor 42 is used to pivot the drive tongues 44 and 45 on the ends of the drive hubs back into engagement with the grooves 46 and 47 on the ends of the drive shafts 23 and 29. Because the locking latches 58 lock the drive shafts 23 and 29 against rotation prior to rotating the drive tongues out of engagement with the grooves 46 and 47, the grooves are in position to receive the tongues when the drive shafts are rotated back to the position shown in FIG. 5. Once the drive hubs 38 and 39 have re-engaged the drive shafts 23 and 29, the locking latches 58 are disengaged from the grooves in the drive shafts, and the drive shafts can be rotated to withdraw the pallet and the workpiece from the machine tool enclosure.

FIG. 8 shows a pallet drive mechanism 10 used with a pallet 65 (shown in phantom) that is vertically supported on a pallet support stand 66. The pallet drive mechanism comprises a pair of drive hubs 38 and 39 that are mounted on a hub carrier 36 and that engage a pair of drive shafts 23 and 29. Each drive shaft is coupled to a respective cam barrel 21 and 27. The pallet 65 is provided with cam followers 68 on the lower edge 67 that are similar to the cam followers 55 that are provided on the underside of the pallet 31 described above. The cam followers on the lower edge 67 of the pallet engage the cam barrels 21 and 27 allowing the pallet to be driven into and out of the machine enclosure. A vertical pallet receiver 69 is positioned inside of the machine enclosure to support the pallet 65 in a vertical position so that a workpiece on the pallet can be machined by a machine tool.

Having thus described the invention, various modifications and alterations will be apparent to those skilled in the art, which modifications and alterations are intended to be within the scope of the invention as defined by the appended claims.

The invention claimed is:

1. A drive system for driving a pallet between a first position on a first side of a guard door plane and a second position on a second side of the guard door plane, the drive system comprising:

an elongated drive assembly having a drive shaft with a longitudinal axis and a cam barrel on at least one end thereof;

a drive hub for driving the drive shaft;

a separable coupling for joining the drive hub in driving engagement with the drive shaft;

a first drive unit for rotating the drive hub and the drive shaft about their longitudinal axis;

a hub carrier for supporting the drive hub for arcuate motion about a vertical axis; and a second drive unit for rotating the drive hub in an arcuate path; whereby the end of the drive hub that comprises a part of the separable coupling moves from one side of the guard door plane to the other side of the guard door plane.

2. The drive system of claim 1 further comprising:

A helical cam groove formed on the surface of the cam barrel; and

At least one cam follower mounted on the pallet, whereby rotation of the cam barrel and the helical groove drives the cam follower and the pallet between the first and second positions.

3. The drive system of claim 1 further comprising:

A tongue and groove coupling comprising the separable coupling, whereby when the tongue and groove are engaged with one another the drive hub is able to impart rotary motion to the drive shaft, and when the tongue and groove are disengaged from one another, the drive hub is able to move from the first side of the guard door plane to the second side of the guard door plane.

4. The drive system of claim 3 wherein the tongue is mounted on the end of one of the drive hub and the drive shaft, and further wherein the groove is mounted on the end of the other of the drive hub and the drive shaft.

5. A drive system for driving a pallet between a first position on a first side of a guard door plane and a second position on a second side of the guard door plane, the drive system comprising:
   a first elongated drive assembly having first and second drive shafts each with a longitudinal axis and each with a cam barrel on one end thereof;
   first and second drive hubs for driving the first and second drive shafts;
   separable couplings for joining the first drive hub in driving engagement with the first drive shaft and the second drive hub in driving engagement with the second drive shaft;
   a first drive unit for rotating the first and second drive hubs and the first and second drive shaft about their longitudinal axis;
   a hub carrier for supporting the drive hubs for arcuate motion about a vertical axis; and
   a second drive unit for rotating the drive hubs in an arcuate path; whereby the separable couplings may be separated and whereby one of the drive hubs that comprise a part of the separable couplings moves from the second side of the guard door plane to the first side of the guard door plane.

6. The drive system of claim 5 further comprising:
   A helical cam groove formed on the surface of the cam barrels; and
   At least one cam follower mounted on the pallet, whereby rotation of the cam barrel and the helical groove drives the cam follower and the pallet between the first and second positions.

7. The drive system of claim 6 further comprising:
   A tongue and groove coupling comprising each of the separable couplings, whereby when the tongue and groove are engaged with one another the drive hub is able to impart rotary motion to the drive shaft, and when the tongue and groove are disengaged from one another, the drive hub is able to move in an arcuate path from the first side of the guard door plane to the second side of the guard door plane.

8. The drive system of claim 7 further comprising:
   A pallet support stand positioned on a first side of the guard door plane, the pallet support stand being configured to support a pallet in a horizontal position.

9. The drive system of claim 8 wherein the cam followers are mounted on the underside of the pallet.

10. The drive system of claim 7 further comprising:
    A pallet support stand positioned on a first side of the guard door plane, the pallet support stand being configured to support a pallet in a vertical position.

11. The drive system of claim 10 wherein the cam followers are mounted on the bottom edge of the pallet.

12. A drive mechanism for inserting and withdrawing a pallet from a first side to a second side of a guard door plane, the mechanism comprising:
    a first pallet support stand located on a first side of the guard door plane;
    a first barrel cam mounted on the first support stand;
    a first drive shaft coupled to the first barrel cam;
    a second pallet support stand located on a second side of the guard door plane,
    a second barrel cam mounted on the second support stand;
    a second drive shaft coupled to the second barrel cam;
    first and second drive hubs adapted to drive the first and second drive shafts;
    a hub carrier for supporting the first and second drive hubs;
    a hub drive motor for imparting rotary motion to the first and second drive hubs;
    separable couplings between the first drive hub and the first drive shaft and between the second drive hub and the second drive shaft; whereby when the separable couplings are coupled, the first and second drive hubs impart rotary motion to the first and second drive shafts, and,
    a positioning motor for rotating the hub carrier, whereby the drive hubs may be pivoted in an arcuate path to separate the separable couplings and to move one of the drive hubs between the first and second sides of the guard door plane.

13. The drive mechanism of claim 12 further comprising:
    a tongue and groove coupling comprising the separable couplings, whereby pivoting the hub carrier in an arcuate path separates the tongue from the groove allowing one of the drive hubs to move between the first and second sides of the guard door plane.

14. The drive mechanism of claim 13 further comprising:
    a helical groove formed on the surface of each of the barrel cams; and,
    a plurality of cam followers mounted on the pallet, whereby the cam followers are driven by the helical grooves to drive the pallet from a first side to a second side of the guard door plane.

15. The drive mechanism of claim 14 wherein the spacing between adjacent cam followers is equal to a multiple of the pitch of the helical grooves that are formed on the cam barrels so that two or more cam followers may simultaneously engage the cam groove in one of the cam barrels.

16. The drive mechanism of claim 12 wherein the first and second pallet support stands support the pallet in a horizontal position.

17. The drive mechanism of claim 12 wherein the first and second pallet support stands support the pallet in a vertical position.

* * * * *